United States Patent [19]

Hayes

[11] Patent Number: 4,513,617
[45] Date of Patent: Apr. 30, 1985

[54] STORAGE TANK GAUGING MEASURING APPARATUS

[75] Inventor: Terry S. Hayes, Wichita, Kans.

[73] Assignee: Mitch's Self Service Gas, Inc., Great Bend, Kans.

[21] Appl. No.: 455,289

[22] Filed: Jan. 3, 1983

[51] Int. Cl.³ .............................................. G01F 23/10
[52] U.S. Cl. .................................. 73/313; 73/304 R; 222/51; 340/870.16; 340/870.38
[58] Field of Search ..................... 73/313; 340/870.04, 340/870.16, 870.38; 338/33; 361/56

[56] References Cited

U.S. PATENT DOCUMENTS

| | | | |
|---|---|---|---|
| 2,305,267 | 12/1942 | Minor et al. | 340/870.16 X |
| 2,388,559 | 11/1945 | Macintyre | 73/313 |
| 2,405,689 | 8/1946 | De Giers | 73/313 |
| 2,537,498 | 1/1951 | Wickesser | 364/509 X |
| 2,554,715 | 5/1951 | Mellett | 73/313 X |
| 3,113,282 | 12/1963 | Coleman | 338/33 |
| 3,842,673 | 10/1974 | Riddel | 338/33 X |
| 3,968,472 | 7/1976 | Taylor | 361/56 X |
| 4,178,802 | 12/1979 | Yamamoto | 73/313 |
| 4,220,047 | 9/1980 | Manboussin | 338/33 X |
| 4,232,300 | 11/1980 | Wright et al. | 340/870.16 X |

FOREIGN PATENT DOCUMENTS 0679343  2/1964  Canada ................................. 361/56

Primary Examiner—Daniel M. Yasich
Attorney, Agent, or Firm—Phillip A. Rein

[57] ABSTRACT

A display apparatus which will numerically indicate the quantity of fluids removed from any tank or tanks by accepting the output from a unit inserted in each tank which varies in resistance from minimum to maximum as the tank moves from a full to an empty condition respectively. The apparatus applies a constant current to the variable resistance and develops a current which changes from minimum to maximum as the tank is emptied. An amplifier accepts the variable current along with a comparison current and converts the differential current to an output current. The current is subsequently applied to an adjusting companion fixed voltage. The display reads the different voltage, and displays the difference, which represents the level or final quantity remaining in the tank. The circuit can also indicate the level of each of several tanks with adjustment in the calibration of the system for each tank.

11 Claims, 2 Drawing Figures

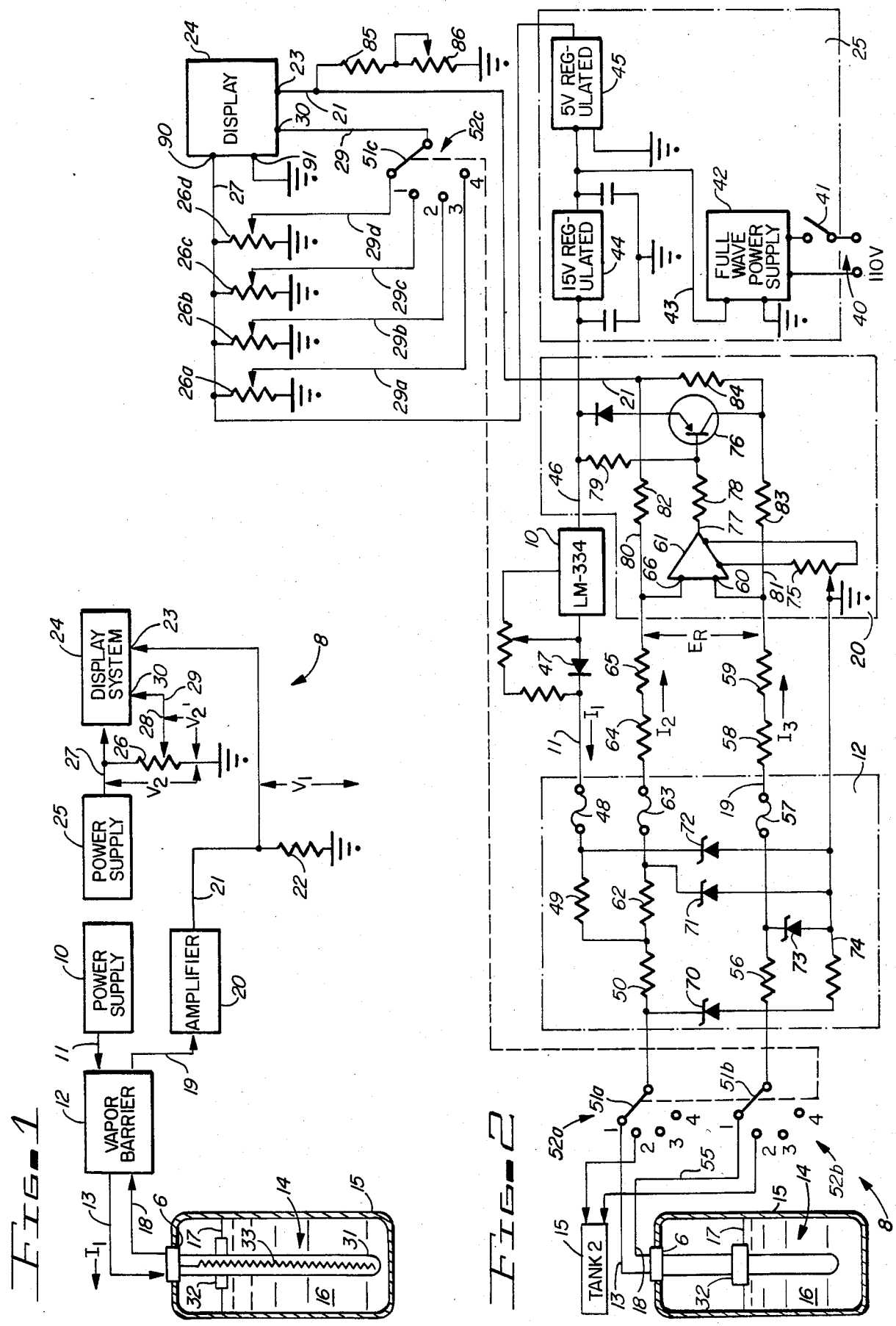

STORAGE TANK GAUGING MEASURING APPARATUS

DISCUSSION OF THE PRIOR ART

Prior to this invention, tanks at filling-stations were gauged to determine the number of gallons used from each of the tanks by inserting a stick into the fill opening of the tanks and noting the maximum height of the gasoline where it wetted the stick. The stick is usually marked with the inches, so the inches measured on the stick must be used to calculate the amount of fluid remaining in the tank, which is determined by the size and shape of the tank.

In a station where only one operator is tending the pumps, making sales, etc . . . , the operation of the station must be curtailed during the time tanks are checked. The period of time required depends on the number of tanks and the skill of the person taking the tests, the weather at the time, as example.

BRIEF DESCRIPTION OF THE INVENTION

This invention solves the problem of the prior art device by providing an electronic system for indicating the level or quantity in each tank and displaying the quantity of each tank on a digital or analog display device. The operator can, by use of a selector switch, read the level of each tank in the confines of the office or area where the gasoline station is controlled, thus saving the time necessary to read the tanks. The system also prevents contamination of the tanks by not requiring their opening during all kinds of weather such as snow, ice or rain.

DESCRIPTION OF THE FIGURES

FIG. 1 is a block diagram of the electronic gauging device; and

FIG. 2 is a detailed schematic of the electronic gauging device.

DETAILED DESCRIPTION OF THE INVENTION

Referring to all of the Figures, but in particular to FIG. 1, a block diagram of the invention is disclosed.

The liquid level indicating or electronic gauging device, 8 includes an electronic circuit which has a power supply 10 coupled through a wire 11 to a vapor barrier 12 which, basically, protects the tanks to be measured from electrical sparks or discharges of any kind. The vapor barrier 12 is of a known intrinsic safety barrier as found in Class 361-56. A wire 13 couples the source of power supply 10 to a measuring means 14, that will be later described, which is mounted in a tank 15 through a fill pipe 6 containing a fluid 16 having a fluid level 17.

A wire 18 couples the power from the measuring means 14 back to the vapor barrier 12 and then, through a wire 19 to an amplifier 20. The output from the amplifier 20 is coupled through a wire 21 to a resistor 22 and to an input 23 of a display or indicating system 24.

A comparison voltage is generated from a regulated power supply 25 and supplied to an adjusting resistor 26 through a wire 27. A tap 28 of the resistor 26 is coupled through a wire 29 to a second input 30 of the display or indicating system 24.

The circuit, as generally described in FIG. 1, operates as follows:

A constant precision current source from the power supply 10 passes a fixed current through wire 11, the vapor barrier 12, and the wire 13 to the measuring means 14. The measuring means 14 includes an elongated tube 31 with a loop resistance wire 33 extending longitudinally along the outer diameter. A float 32 moves up and down with a change in the fluid level 17 of the fluid 16 in the tank 15. As the float 32 moves up or down, it shorts between the resistance wires 33 causing the resistance to increase as the fluid level 17 drops.

When the tank 15 is full of fluid, the measuring means 14 is at its minimum resistance and the current is at a maximum value. The current continues through the wire 18, the vapor barrier 12, the wire 19, and into the amplifier 20 in relation to the resistance of the measuring means 14. When the tank 15 is full, the developed voltage will be minimum and, when the tank 15 is empty, the developed voltage at the amplifier 20 is maximum. The amplifier 20 is a voltage to current amplifier, which developes a current at its output directly proportional to be voltage at its input. This current passes through the resistor 22 developing a voltage $V_1$ which is indicative of the fluid level 17 in the tank 15. The voltage $V_1$ is applied to the input 23 of the differential volt meter display system 24.

In order to obtain a proper reading at the volt meter or display system 24, a comparison voltage $V_2$ is developed at the regulated power supply 25 which comparison voltage is applied to the adjusting resistor 26. We now develop a corrected voltage $V2^1$ which is applied through the wire 29 to the second differential volt meter input 30. Because each tank may be of a particular size and configuration, each tank 15, between the full and empty limits, will generate a certain differential voltage which must be calibrated for each tank 15 at the time of initial installation and periodically.

The above procedures will be discussed with reference to FIG. 2. All components except the wires 13, 18 and the measuring means 14 respectively to the tank(s) are preferably in the unit where the measurements are displayed.

Referring to the diagram of FIG. 2, the power supply essentially consists of a 110 V service 40 which may be controlled by a switch 41 which, when closed, applies power to a full wave power supply 42. The output from the power supply 42 is direct current which is coupled through a wire 43 to: (1) a 15-volt regulated output voltage supply 44; and (2) a 5-volt regulated supply 45. The output from voltage supply 44 is coupled through a wire 46 to the constant precision current source 10. The output from the precision current source 10 is supplied through (1) a diode 47; (2) a wire 11; (3) a fuse 48; (4) resistors 49 and 50, and; (5) to a switch arm 51a of a switch segment 52a. For the first tank 15 being No. 1, the wire 13 is coupled to the measuring system 14, and returns through the wire 18 to a switch position #1 on a switch segment 52b. A wire 55 connected to the wire 18 coupled switch arm 51b through: (1) a resistor 56; (2) a fuse 57; (3) a resistor 58; (4) the wire 19; (5) a resistor 59; and (6) to an input 60 of an amplifier 61.

A second resistor 62 is attached between the resistors 50 and 49 and is connected to: (1) a fuse 63; (2) resistors 64 and 65; and (3) to a second input 66 of the amplifier 61. A plurality of diodes 70, 71, 72, and 73, provide for a fail safe system of the vapor barrier 12. A wire 74 connects the plurality of diodes 70 through 73 to ground. More particularly, it is seen that: (1) the diode 70 is connected between the resistor 50 and the switch arm 51a and to the ground; (2) the diode 71 is connected between the resistor 62 and the fuse 63 and to the ground; (3) the diode 72 is connected between the resistor 49 and the fuse 48 and to the ground; and (4) the diode 73b connected between the resistor 56 and the fuse 51 and to the ground.

Referring to the amplifier 61, an adjustable resistor 75 is used to set the gain for the amplifier 61. The output of amplifier 61 is applied to a transistor 76 through a wire 77 and a resistor 78. The proper bias is supplied to the transistor 76 through a resistor 79. Wires 80 and 81 are coupled through resistors 82 and 83, respectively, to each side of a resistor 84.

The output from the amplifier 61 and the transistor 76 is supplied through a wire 21 to a fixed calibration resistor 85 and a variable calibration resistor 86 to ground and through wire 21 to the input 23 of the display system 24. The comparison voltage is generated by the 5-volt regulated supply 45 and passes through a wire 27 to various calibration resistors 26a, 26b, 26c, and 26d, representing the various size of tanks 15 being measured. The output from each resistor 26a through 26d passes down wires 29a, 29b, 29c, and 29d respectively, to switch segment 51c selectively connectable to terminals (1) through (4). The output is selected by switch arm 51c and is coupled through wire 29 to input 30 of display 24.

USE AND OPERATION OF THE INVENTION

The power supply operates in the usual manner and the voltage supply 44 presents an output of 15 volts D.C. regulated and the power supply 45 presents an output of 5 volts D.C. regulated. The precision current source 10 is an integrated circuit LM-334 and is well known. The current source 10 basically generates a precision current with variation in resistance. An output current $I_1$ from the current source 10 travels: (1) down the wire 11; (2) through the fuse 48; (3) through resistors 49 and 50; (4) through the switch segment 52a; and (5) into the measuring means 14. The resistance in the resistance wires 33 changes with variation in the fluid level 17 in tank 15 being No. 1, for example.

The output current $I_1$ then passes through: (1) the switch segment 52b; (2) the resistor 56; (3) the fuse 57; (4) the wire 19; and other resistors where needed including the resistance of it's connecting wires. This output current $I_1$ is coupled to the input 60 of the amplifier 61 along with a standard current supply through: (1) the resistor 62; (2) the fuse 63; (3) the resistors 64, 65; and (4) to the second input 66 of the amplifier 61. Since the only change in the circuit will be a change in resistance in the resistance wires 33 of the measuring means 14 on change in the fluid level 17, (regardless of the length of wires connecting the circuit) the differential current, represented as a voltage to ground, will appear at the input 68 and 60 at the amplifier 61 as a voltage difference ER. This voltage differential will be amplified as a current by the amplifier 61 and the transistor 76 and passed through the resistor 84 as a variable current directly corresponding to the variation in ER. The current through resistor 84 will generate a corresponding voltage $V_1$ which will be supplied to the input 23 of the display system 24.

Since the display system 24 is preferably a differential volt meter, a corresponding voltage must be used to represent total inches being measured by the measuring means 14. This value may change depending upon the size of the respective tank 15 (diameter and length) and therefore, the comparison voltage from the 5-volt D.C. regulated supply 45 is coupled to the respective resistors 26a through 26d. If all of the tanks 15 are the same diameter, then the resistors will be the same value. The output from each resistor 26a through 26d, respectively, is then selectively supplied through the switch segment 51c and the wire 29 to the second input 30 of the display system 24. Operating power for the display system 24 is through the wire 27 to an input terminal 90 with an output terminal 91 coupled to ground.

When the tank 15 being No. 1, for example, is full, the current $I_2$ to the second input 66 of the amplifier 61 will equal the current $I_3$ to the input 60 of the amplifier 61. Thus, the differential voltage ER will be near zero and the current through the resistor 84 will be near zero and the voltage $V_1$ will be near zero. The output from the 5-voltage supply 45 will then be set with the resistor 26a for the tank 15 being tank No. 1 to a value representing the maximum measured inches in the respective tank 15 when it is full. This value will be preferably displayed as a digital readout by the display system 24.

As fluid 16 is removed from the tank No. 1, and the fluid level 17 drops, the float 32 will move down increasing the resistance in the resistance wires 33 of the measuring means 14. This is because the float 32 causes contact between wires 13 and 18 and, as the float 32 descends more wire is involved in the circuit thus more resistance is incurred. This increase in resistance in the measuring means 14 will cause a decrease in the current $I_3$ causing the differential voltage ER to increase. Thus, the current through the resistor 84 will increase causing the voltage $V_1$ to increase. Therefore, with an increasing voltage through the line 21 to the input 23 (with the voltage at the second differential volt meter input 30 constant) the differential volt meter display system 24 will indicate a lessor voltage representing a drop in the inches of the fluid level 17 in the tank 15. The variable calibration resistor 86 and amplifier control or adjustable control 75 can be set so that the voltage being displayed by a digital readout on the display system 24 represents actual inches depth of the fluid level 17 in the tank 15. It is obvious that the output at the terminal 30 and 23 could be supplied to a micro-processor to convert the amount of the fluid 16 in the respective tanks 15 to gallons or the amount of the fluid 16 removed from the respective tanks 15 in gallons.

Although only a single tank 15 being No. 1 has been particularly described in detail, it is obvious that many tanks 15 can be selectively measured by merely operating the switch segments and 52a and 52b for each tank in the system. Concurrently, the adjusting resistor 26 is selectively made operative by the switch segment 52c to one of the terminals (1), (2), (3), and (4).

The vapor barrier 12 provides protection for the system against shorts or open circuits causing an explosion or fire in the respective tanks 15 which are normally gasoline-fuel storage containers. If an over voltage situation occurs in any of the wires 11 or, if for any reason, the current indicated at $I_1$, $I_2$, or $I_3$ gets too high, the resistors 50, 62, 56, or 49 will cause an increase in voltage drop, each of them applying a break down to their corresponding zenier diodes 70, 71 73 and 72 causing the fuses 48, 63, or 57 to blow thus opening the circuit and decreasing the high current to zero.

It is seen that the measuring means 14 can be readily installed in the available fill pipes 6 on existing tanks 15 with a minimum amount of expense and effort. Therefore, the electronic gauging device 8 can be economically installed at existing service station operations to provide immediate and efficient reading of the fluid levels in the storage tanks.

It is obvious that changes can be made in the particular circuits by the use of integrated circuits or circuits operating in substantially the same way and still be within the scope of this invention, as particularly described in the specification and appended claims,

What I claim is:

1. A quantity indicator for a fluid storage system comprising:
   (a) measuring means an electrical power source means connected to meausring means, said measuring means coacting with float operated means mounted in said storage system to produce separate outputs in response to the maximum and minimum quantity of fluid remaining in said system;
   (b) means for receiving said generated output responses, and converting said responses at corresponding voltage $V_1$;
   (c) calibration means coupled to said receiving and converting means, for setting the maximum voltage deviation of said voltage $V_1$ from said fluid storage system between a maximum and minimum condition;
   (d) comparison voltage generation means developing an output voltage $V_2$;
   (e) adjusting means for accepting said voltage $V_2$ and setting said voltage $V_2$ to a value $V_2$ corresponding to the value of $V_1$ at a maximum fluid quantity indication; and,
   (f) display means accepting said voltage $V_1$ and $V_2$ and indicating the difference in said voltages, and displaying said difference.

2. Apparatus as described in claim 1, wherein:
   (a) said storage system includes a storage tank having a filler tube through which fuel is added thereto; and
   (b) said measuring means mounted in said filler tube without requiring modification of said storage tank.

3. Apparatus as described in claim 1, wherein said fluid storage system comprises a plurality of individual tanks, each of which has an individual measuring means; including:
   (a) a plurality of adjusting means for accepting said voltage $V_2$ and setting said voltage $V_2$ to a value of said voltage $V_2$ corresponding to the value of said voltage $V_1$ at a maximum fluid indication for each of said tanks;
   (b) a second adjusting means for setting said voltage $V_1$ range corresponding to each of said tanks;
   (c) means for switching each of said corresponding adjusting means and said second adjusting means for each of said corresponding tanks whereby the quantity removed from each of said tanks can be determined.

4. A quantity indicator for a fluid storage system which includes an electrical power source connected to a measuring means, said measuring means coacting with a float operated means and mounted in said storage system to produce separate output in response to the quantity of fluid removed from said system, said indicator comprising;
   (a) means for receiving said generated output response and converting said response to a current which corresponds to magnitude to variations the magnitude of said output response;
   (b) means for generating a voltage $V_1$ corresponding to said current;
   (c) means for adjusting the maximum voltage deviation of of said voltage $V_1$ for a maximum variation in said output response;
   (d) comparison voltage means generating an output voltage $V_2$;
   (e) second means for adjusting the value of said voltage $V_2$ to a value of said voltage $V_2$ corresponding to the maximum value of said voltage $V_1$; and,
   (f) display means receiving said voltage $V_1$ and said voltage $V_2$ and readably displaying the difference in voltage between said voltages whereby, said differential voltage will correspond to the fluid removed from said storage means.

5. Apparatus as described in claim 4, wherein said fluid storage system comprises a plurality of individual tanks, each of which has an individual measuring means therein and includes:
   (a) a plurality of second adjusting means for accepting said voltage $V_2$ and setting said voltage $V_2$ corresponding to the value of said voltage $V_1$ at a maximum generated output response for each individual tank;
   (b) means for switching each of said corresponding second adjusting means with said individual corresponding tanks, whereby, each tank can be displayed as to the fluid remaining in said tank.

6. Apparatus as described in claim 5, wherein;
   (a) said tanks each having a filler tube through which fuel is added thereto; and
   (b) one of said measuring means mounted in respective ones of said filler tubes without requiring modification of respective ones of said tanks.

7. A quantity indicator for a fluid storage system that includes a resistive measuring means connected to an electrical power source means, said measuring means coacting with a float operated means mounted in said tank which changes from low resistance to a high resistance as said tank proceeds from full to empty, said quantity indicator comprising:
   (a) a constant current source coupled to said resistive measuring means and generating a current proportional to the amount of fluid removed from said tanks, including a reference current;
   (b) amplifier means accepting said voltage output and said reference current, generating a current output proportional to the difference between said reference current and said proportional current;
   (c) means for accepting an output current and generating a corresponding voltage;
   (d) comparison power supply means generating a comparison voltage;
   (e) means for adjusting said comparison voltage for the size of said tank storage means;
   (f) display means for accepting said adjusted comparison voltage and said corresponding voltage and displaying the said difference voltage between said voltage as is indicative of said remaining fluid in said tank.

8. Apparatus as described in claim 7, wherein said means for accepting said generated current output and generating a corresponding voltage comprises an adjustable resistor.

9. Apparatus as described in claim 7, wherein said means for adjusting said comparison voltage comprises an adjustable resistor.

10. Apparatus as described in claims 7, 8 or 9, wherein said fluid storage system comprises a plurality of tanks, each of which has individual resistive measuring means and wherein said quantity indicators include separate adjustable resistors for each of said tanks for the adjustment of said comparison voltage, and switch means for connecting said corresponding separate adjustable resistors, and the corresponding individual resistive measuring means.

11. Apparatus as described in claim 7, wherein;
(a) said tanks each having a filler tube through which fuel is added thereto; and
(b) one of said measuring means mounted in respective ones of said filler tubes without requiring modification of respective ones of said tanks.

* * * * *